Jan. 17, 1950 A. GREINER 2,494,871
APPARATUS FOR BENDING GLASS TUBES
Filed April 27, 1944 2 Sheets-Sheet 1
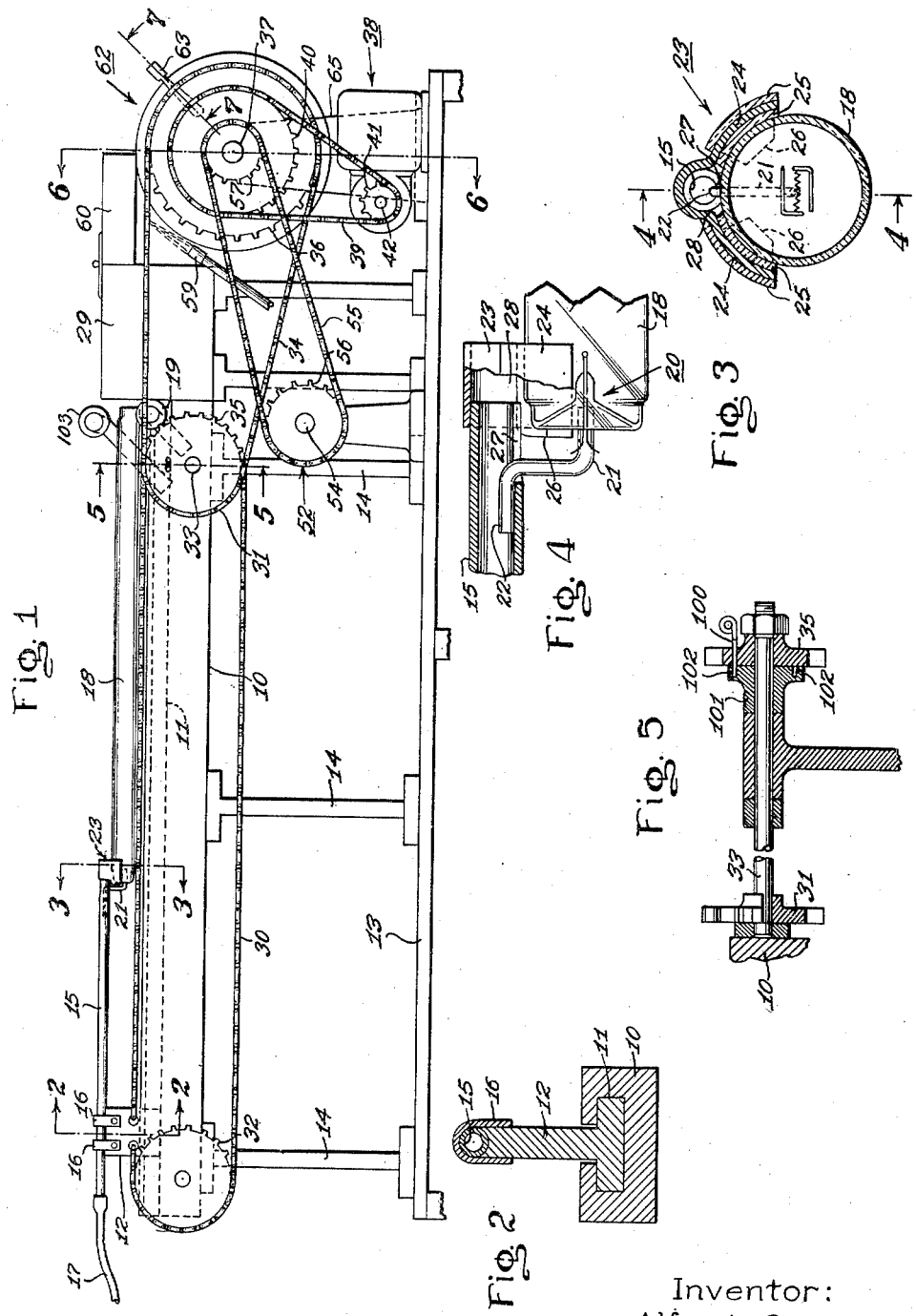
Inventor:
Alfred Greiner,
by John H Henderson
His Attorney Jan. 17, 1950 A. GREINER 2,494,871
APPARATUS FOR BENDING GLASS TUBES
Filed April 27, 1944 2 Sheets-Sheet 2
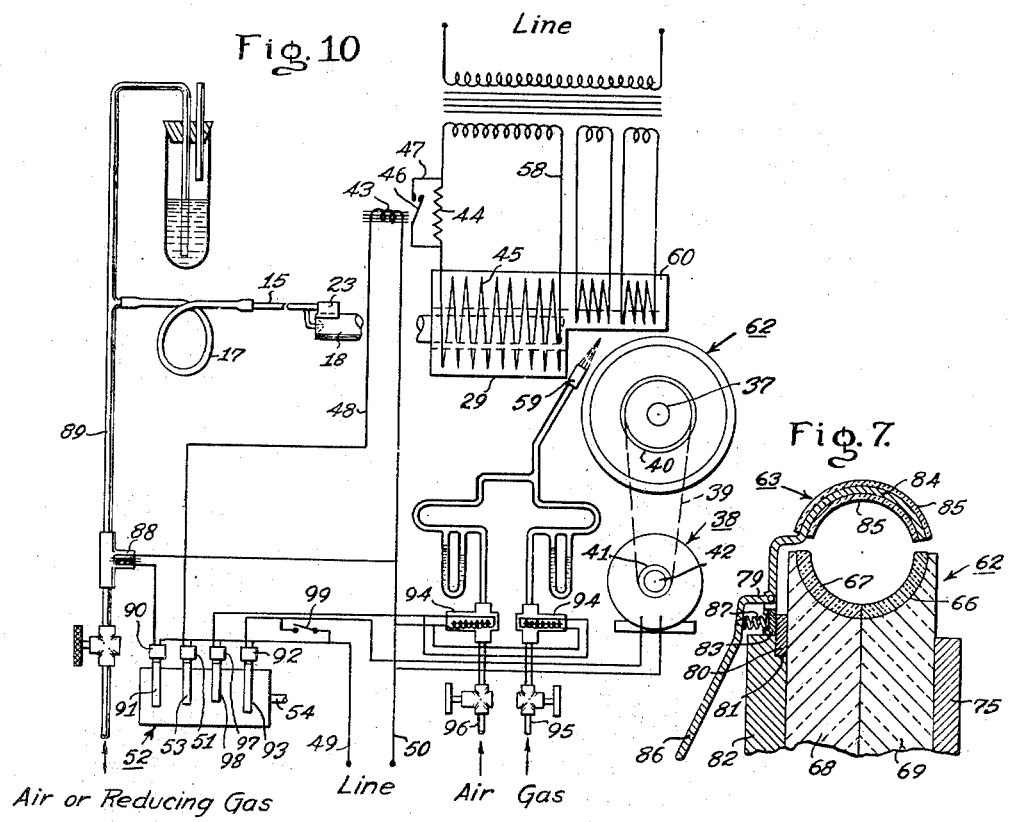
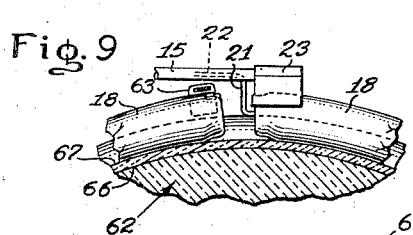
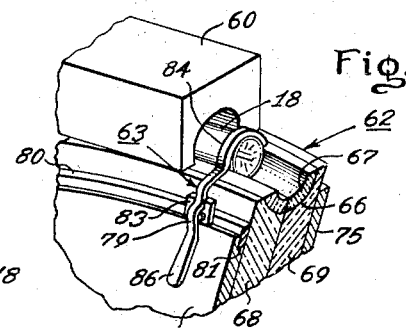
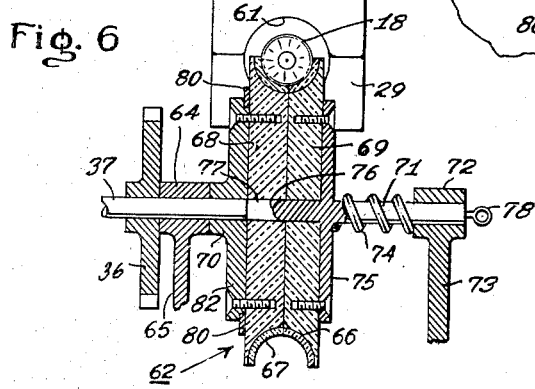
Inventor:
Alfred Greiner,
by John H Anderson
His Attorney Patented Jan. 17, 1950

2,494,871

UNITED STATES PATENT OFFICE 2,494,871

APPARATUS FOR BENDING GLASS TUBES

Alfred Greiner, Cleveland Heights, Ohio, assignor to General Electric Company, a corporation of New York Application April 27, 1944, Serial No. 534,536

6 Claims. (Cl. 49—7)

My invention relates, in general, to apparatus for bending glass tubing into arcuate or circular shape, and more particularly to apparatus for bending tubular electric discharge devices, such as fluorescent lamps, into circular shape.

One object of my invention is to provide an apparatus for bending a glass tube into true arcuate or circular shape without deforming the cross-sectional shape of the tube.

Another object of my invention is to provide an apparatus for bending the envelope assembly of a tubular electric discharge device into true arcuate or circular shape without deforming the cross-sectional shape of the tubular glass envelope.

Further objects and advantages of my invention will appear from the following description of a species thereof and from the accompanying drawing in which:

Fig. 1 is a diagrammatic side elevation of apparatus comprising my invention; Fig. 2 is a transverse section on the line 2—2 of Fig. 1; Fig. 3 is a transverse section on the line 3—3 of Fig. 1; Fig. 4 is a fragmentary section, on the line 4—4 of Fig. 3, of the forward end of the push tube and the co-operating end of the tubular glass element to be bent; Fig. 5 is a fragmentary transverse section on the line 5—5 of Fig. 1; Fig. 6 is a transverse section through the grooved reshaping form, on the line 6—6 of Fig. 1; Fig. 7 is an enlarged sectional view, on the line 7—7 of Fig. 1, showing the clamp on the split form for fastening the forward end of the glass element thereto; Fig. 8 is a fragmentary perspective view of the reshaping form showing the manner in which the front end of the glass element is clamped to the form; Fig. 9 is a fragmentary section through the reshaping form showing the opposite end portions of the glass element in position on said form during the final stages of the bending operation; and Fig. 10 is a wiring diagram showing the various control circuits for the apparatus comprising my invention.

In accordance with the invention, the glass tube or tubular lamp to be bent is first carried through a heating zone wherein the glass is heated to the proper plastic condition for bending, after which an end of the heated tube or lamp is fastened tangentially to the periphery of a rotatable drum-shaped form, within a peripheral groove therein, and the form then rotated to draw and bend the attached plastic tube around the form and within the said groove. The form is divided into two disc-shaped sections axially separable at the peripheral groove to thereby permit removal of the bent glass element from the form.

Referring to the drawings, the apparatus according to the invention comprises a horizontally extending guide or slide track 10 having a guideway 11 in the upper side thereof within which a slide block or shoe 12 is slidably mounted. The guide or slide track 10 is supported on a stand or table 13 by a plurality of upstanding support legs or standards 14. A hollow push tube 15 is rigidly fastened to the slide block 12 as by straps 16, the said tube extending longitudinally of the slide track 10 and forwardly of the slide block. The rear end of the tube 15 is connected by a flexible conduit 17, such as a rubber tube, to a source of air, or a suitable non-oxidizing or reducing gas such as nitrogen, under pressure. The use of a reducing gas will prevent oxidation of the metal parts of a lamp envelope assembly where the tubular glass element to be bent is in the form of such a lamp assembly.

The tubular glass element 18 to be bent is horizontally supported above the slide track 10 in a position extending longitudinally of the said track. For this purpose, the slide track 10 is provided with a concavely grooved roller 19 at its forward end for supporting the forward end of the glass element 18, while the rear end of the glass element is supported by the front end of the push tube 15 in a way such that the said tube communicates with the hollow interior of the glass element. In the particular case illustrated, the glass element 18 comprises the glass envelope assembly of a tubular electron discharge device, such as a fluorescent lamp for instance, the said lamp 18 comprising a tubular glass envelope having a mount 20 (Fig. 4) sealed within each end thereof and an exhaust tube 21 extending from the rear end thereof. Where the lamp is to be bent into substantially a complete circle, the exhaust tube 21 is laterally offset a sufficient amount to one side of the envelope, at a point closely adjacent the rear end of the envelope as shown in Fig. 4, so as not to interfere with the front end of the envelope during the final stages of the circular bending operation. The offset portion 22 of the exhaust tube 21 is inserted within the forward end of the push tube 15, which is likewise offset upwardly of the lamp axis so as not to interfere with the front end of the lamp 18 during the final stages of the circular bending operation. The offset exhaust tube portion 22 rests against the wall of the push tube 15 to thereby support the rear end of the lamp 18.

As shown in Figs. 3 and 4, the forward end of the push tube 15 is provided with a hold-down shoe 23 overlying the rear end of the lamp 18 and having wing portions 24 curved on their underside to conform to the curvature of and engage the wall of the lamp. The wings 24 may be lined with asbestos at least on their under or bulb engaging side, as indicated at 25 in Fig. 3. The rear ends of the wings 24 are formed with depending lips or lugs 26 which overhang and engage the rear end of the lamp 18 to thereby transmit the forward pushing movement of the push tube 15 to the lamp. To permit insertion of the offset portion 22 of the lamp exhaust tube 21 into the push tube 15, the said tube 15, as well as the hold-down shoe 23, are slotted on their underside, as indicated at 27 and 28 respectively.

After the lamp 18 has been mounted in position on the support roller 19 and push tube 15, the latter is moved forward at a relative slow and uniform rate to thereby advance or push the lamp 18 through a heating zone preferably provided by an oven or furnace 29, such as an electric furnace. The movement of the push tube 15 is preferably mechanically imparted thereto by suitable means, such as by a chain belt 30 to which the slide block 12 is connected, the chain belt 30 connecting a pair of sprockets 31 and 32 rotatably mounted on the slide track 10 at the front and rear ends thereof, respectively. The shaft 33 on which the front or drive sprocket 31 is mounted is driven by another chain belt 34 connected between sprockets 35 and 36 mounted, respectively, on the said shaft 33 and on a main drive shaft 37. The main drive shaft 37 is driven by an electric motor-speed reducer unit 38, mounted on the table 13. through a chain-belt 39 connecting sprockets 40, 41 on the main drive shaft 37 and speed reducer shaft 42, respectively. The drive for the lamp-advancing chain belt 30 is so designed so as to slide the block 12 forwardly in its guideway 11, and thus cause the push tube 15 to advance the lamp 18 through the oven 29 at a uniform and relatively slow rate of about 2 feet or so per minute, for instance.

The electric furnace or oven 29 is normally heated to a temperature just below the softening point of the glass of which the lamp 18 is made. Thus, in the case of a soft lead-glass lamp envelope, the oven is normally heated to a temperature of around 800° C. or thereabouts.

After the lamp 18 has advanced a predetermined distance into the oven 29, a relay 43 (Fig. 10) is actuated to shunt out a resistance 44 normally connected in series with the oven resistance-heating element 45. This produces increased current flow through the oven heating element 45 resulting in increased heating effect therefrom which thus compensates for the absorption of heat by the lamp, as it passes through the oven, and therefore maintains the oven at a substantially even temperature. As shown in Fig. 10, the relay 43, when energized, closes a switch 46 thereby completing a shunt circuit 47 around the resistance 44. The relay 43 is connected by leads 48, 49, 50, and through a microswitch 51, to a suitable source of current supply. The microswitch 51 is controlled by a rotatable cam 52 having an arcuate switch-engaging segment 53 for closing the microswitch 51. The cam 52 is mounted on a shaft 54 supported on the table 13, and is rotated at a given speed by a chain belt 55 connecting a sprocket 56 on the cam shaft 54 with a sprocket 57 on the main drive shaft 37. After the completion of the lamp bending operation, the cam segment 53 disengages the microswitch 51 to thereby break the circuit through the relay 43 and thus permit thte switch 46 to open and break the shunt circuit 47 across the resistance 44, thus restoring the oven heating-element circuit 58 to its original condition wherein the resistance 44 is connected in series with the heating element 45.

The passage of the lamp 18 through the oven 29 serves to progressively preheat the advancing lamp to a temperature just below the softening point of the glass of which the lamp envelope is made. Upon emerging from the oven 29, the lamp 18 passes through a supplementary heating zone wherein the glass lamp envelope is locally heated to its softening point just prior to the bending or reshaping of the same. Such localized supplementary heating is preferably provided by means of one or more (preferably two) gas burners 59 directed against the under side or half of the tubular lamp envelope, in conjunction with an electric resistance-heating shoe 60 overlying the lamp and mounted on the front end of the oven 29. As shown in Fig. 6, the underside 61 of the electric heating shoe 60 is of concave shape conforming to the cross-section of the lamp envelope, and it encloses substantially the entire upper half section of the said envelope. The degree of localized heating of the lamp 18 by the gas burners 59 and electric shoe 60 is adjusted to give the desired temperatures of the upper and lower half sections of the lamp envelope. Preferably, however, considerably more heat is applied by the electric shoe 60 to the upper side or half of the lamp than is applied to the lower side by the burners 59, for the reason that most of the stretching of the glass, during the bending operation, takes place at the upper or outer side of the lamp.

As soon as the front end of the advancing lamp 18 emerges from underneath the electric shoe 60, it is clamped to the periphery of a slowly rotating re-shaping form or drum 62 (as shown in Fig. 8) by means of a clamp 63 on said form, the rear end of the lamp still being supported on the roller 19. The electric shoe 60 extends over the top of the reshaping form 62 to a point directly above the axis of rotation of the form (Fig. 1) so that the upper side of the lamp is heated right up to the moment when the bending of the lamp begins.

The re-shaping form 62 is mounted on the horizontal main drive shaft 37 which extends transversely of the advancing lamp 18 and is journalled in a bearing 64 on an upstanding bracket 65 fastened to the table 13. The rotative speed of the form 62 is such that its peripheral surface speed corresponds to the speed of the linear advancing movement of the lamp 18. The periphery of the form 62 is provided with an annular groove 66 lined with asbestos 67 and conforming in cross-section to, and aligned with, the lamp envelope so as to partially accommodate the envelope therein. In the particular case illustrated wherein the lamp 18 is of circular cross-section, the peripheral groove 66 is of substantially full semicircular cross-section so as to accommodate approximately one-half (i e. the under half) of the cross-sectional periphery of the lamp envelope.

To permit removal of the bent lamp 18 from the winding form 62 where the lamp is to be bent into an arc of more than 180°, the said form 62 is split or divided into two disc-shaped halves or sections 68, 69 normally held in face-to-face abutting relation but axially separable from each other along a parting line defining a vertical plane passing through the center line of the semi-circular lamp receiving groove 66 which is formed when the two discs are in face-to-face engagement. The discs 68, 69 may be made of any suitable material, for instance, pressed asbestos. One of said discs, i. e. disc 68, is axially fixed, it being screwed or otherwise fastened to a flanged collar 70 which is keyed or otherwise locked to the main drive shaft 37. The other disc 69 is axially displaceable away from the fixed disc 68, it being screwed or otherwise fastened to a flanged shaft or pin 71 which is journalled in a bearing 72 on an upstanding bracket 73 fastened to the table 13. A compression coil spring 74, interposed between and bearing against the bearing 72 and the flange 75 on the shaft 71, normally maintains the disc 69 in frictional face-to-face engagement with the other axially-fixed disc 68. The shaft 71 extends through the disc 69 and projects a short distance beyond the inner face thereof, as indicated at 76. The said projecting shaft portion 76 is rounded at its inner end and fits snugly into a central opening 77 in the axially-fixed disc 68 when the two discs are in abutting engagement, to thereby insure proper alignment or centering of the engaged discs. At its outer end, the shaft 71 is provided with a suitable handle or finger grip 78 for pulling the shaft 71 and attached disc 69 outwardly to thereby axially separate the said disc from the other disc 68.

The clamp 63 for holding the front end of the lamp 18 within the groove 66 in the winding form 62, comprises a lever 79 (Figs. 7) pivotally mounted on a ring 80 rotatable within a groove 81 in the periphery of the flange 82 on collar 70. The lever 79 is pivotally mounted on a small block 83 fastened to the ring 80, and the rotatability of the ring 80 relative to the disc 68 permits the adjustment of the clamp 63 to any angular position around the re-shaping form 62. One arm 84 of the lever 79 extends across the annular groove 66 of the closed form 62 and is curved to conform to and engage the exposed or outer half portion of the cross-sectional periphery of the lamp within the said groove 66. The curved or arcuate lamp-engaging arm 84 of the clamp lever 79 is preferably covered with asbestos or other heat-insulating material, as indicated at 85. The other arm 86 of the clamp lever 79 is formed as a handle for operating the clamp. A compression coil spring 87, interposed between and bearing against the lever arm 86 and the lever support block 83, normally maintains the clamp lever 79 in its closed or lamp-clamping position, as shown in Fig. 7.

At about the same time the front end of the advancing lamp 18 is clamped to the reshaping form 62 by the clamp 63, a suitable non-oxidizing gas such as nitrogen, under relatively low pressure, is introduced into the heated lamp to prevent collapsing of the softened glass wall thereof. As shown in Fig. 10, the gas supply for such purpose is produced by the opening of a solenoid-actuated valve 88 in the gas line 89 which is connected to the push tube 15 by the flexible conduit or tube 17. A sufficient amount of the gas flowing through the push tube 15 then enters the lamp exhaust tube 21 and flows into the lamp to thus prevent the collapsing of the softened wall of the lamp. The gas passing through the tube 15 may be at a pressure of 1½ to 2 inches head of water, for instance.

The flow of gas through the push tube 15 and into the lamp 18 is automatically turned on just before the start of lamp bending and continues until the bending operation is completed; when it is automatically turned off. For this purpose, the solenoid of the valve 88 in the gas supply line 89 is connected to a source of current supply through a microswitch 90 which is controlled by a segment 91 on the cam 52. The cam segment 91 closes the switch 90 at the proper instant to complete the circuit through the solenoid of the valve 88 and thus open the latter to permit the flow of gas through the gas line 89 and push tube 15 and thence into the lamp 18. Upon completion of the lamp bending operation, the cam segment 91 disengages the switch 90, allowing the latter to open and thus break the circuit through the solenoid of the valve 88 which then closes to shut off the gas flow in the gas line 89.

After the clamping of the front end of the heated lamp to the form 62, the continued slow rotation of the latter causes the softened lamp to be progressively drawn and bent around the form, the bending force being provided by the weight of the rear portion of the advancing lamp which has not as yet reached the reshaping form. During the final stages of the bending operation, however, very little of the length of the lamp remains to provide the bending force necessary to urge or bend the rear end of the lamp down into the groove 66 in the reshaping form 62. To therefore provide the necessary bending force to insure the continued and proper bending of the lamp right to the very end thereof, the push tube 15 may be lightly pressed down during the final stages of the bending operation so as to cause the hold-down shoe 23 to press down on the rear end of the lamp and thus continuously urge the rear portions of the lamp down into the groove 66 in the reshaping form 62. The downward pressure on the push tube 15 may be manually applied thereto, or it may be applied thereto by suitable guide means such as a roller 103 engaging with the upper side of the push tube to prevent any upward springing of the unsupported forward end portion of the push tube which otherwise may occur.

Upon completion of the bending operation, the electric motor of the motor-reducer unit 38 is automatically turned off by the opening of a microswitch 92 in the motor circuit, the said switch being controlled by a segment 93 on the cam 52 which segment disengages the switch 92, at the completion of the bending cycle, to thereby permit the said switch to open and thus interrupt the motor circuit. Likewise, the gas fires from the burners 59 are preferably shut off automatically, upon completion of the bending operation, by the closing of solenoid-actuated valves 94 located in the gas and air lines 95 and 96, respectively, for the burners. The closing of the valves 94 is effected by the opening of a microswitch 97 connected in and controlling the electrical circuits for the solenoids of the valves, the said switch 97 being controlled by a segment 98 on the cam 52. The cam segment 98 is arranged to engage and close the switch 97, to thereby open the valves 94 and turn on the gas fires from the burners 59, at the proper time during the travel of the lamp through the heating zone; i. e., just before it reaches the point where it is to be heated by the gas fires from the burners 59.

When the form 62, with the lamp wrapped therearound, has stopped its rotational movement, the axially-movable half-section 69 of the form is separated from the other axially-fixed half 68 thereof and the lamp then removed from the form through the space between the separated form half-sections.

Following each bending cycle, the apparatus is re-set to proper starting position preparatory to the start of the next lamp bending operation. This is done by first disengaging the drive between the sprocket 35 and its support shaft 33, then running the motor 38 by closing a hand switch 99 in the motor circuit until the cam 52 has completed its full revolution and is again in its original starting position, and finally withdrawing the push tube 15 and the associated slide block 12 to their original starting position while maintaining the disengagement of the drive between sprocket 35 and shaft 33. As shown in Fig. 5, the drive between the sprocket 35 and its support shaft 33 is through a drive pin or key 100 which interconnects and rotatively locks the said sprocket with a flanged collar 101 keyed or otherwise fastened on the shaft 33. The drive pin 100 projects through and is slidably mounted within the sprocket 35 which is freely rotatable on the shaft 33. The flanged portion of the collar 101 is provided with an annularly arranged series of holes or recesses 102 into any one of which the pin 100 is insertable to rotatively interlock the sprocket 35 and collar 101. The disengagement of the drive between the sprocket 35 and its support shaft 33 is effected by simply withdrawing the pin 100 from its co-operating recess 102 in the collar 101.

After the lamps 18 have been bent into circular shape in the manner described hereinabove, they are subsequently exhausted, filled with gas, sealed-off, and finally based all in the conventional manner, thereby completing their manufacture. The base with which the lamp is provided may be of any suitable type, such as that shown, for instance, in U. S. Patent No. 2,339,166 to W. Harrison, issued January 11, 1944.

What I claim as new and desire to secure by Letters Patent of the United States is:

1. Apparatus for bending tubular glass elements comprising, means providing a heating zone, means adjacent the heating-zone to support and advance the glass element through said heating zone, a drum-shaped form disposed adjacent the path of travel of the heated glass element and adapted to receive the element in tangential relationship, said form having a peripheral groove for receiving the element therein, gripping means on said form for attaching an end of the heated glass element to the form and within the groove therein, and support means comprising a pair of aligned support shafts rotatably mounting said form for rotation about its axis to thereby cause the heated glass element to be bent around the form within the groove therein, said form being divided into two disc-shaped sections each mounted on a respective one of said support shafts and being axially separable on their support shafts at said groove to provide an unobstructed space therebetween for removal of the bent glass element from said form by movement thereof through the said space.

2. Apparatus for bending tubular glass elements comprising, means providing a heating zone, means adjacent the heating zone to support and advance the glass element through said heating zone, a drum-shaped form disposed adjacent the path of travel of the heated glass element and adapted to receive the element in tangential relationship, said form having a peripheral groove for receiving the element therein, gripping means on said form for attaching an end of the heated glass element to the form and within the groove therein, support means comprising a pair of aligned support shafts rotatably mounting said form for rotation about its axis to thereby cause the heated glass element to be bent around the form within the groove therein, said form being divided into two disc-shaped sections each mounted on a respective one of said support shafts and being axially separable at said groove to provide an unobstructed space therebetween for removal of the bent glass element from said form by movement thereof through the said space, and means comprising a gaseous pressure supply adapted to be connected to the interior of the glass element for maintaining the atmosphere within said element at a sufficient pressure during the bending of the element to prevent collapsing of the softened wall thereof.

3. Apparatus for bending tubular glass elements comprising, means providing a heating zone, means adjacent the heating zone to support and advance the glass element longitudinally thereof through said heating zone, a rotatable drum-shaped form disposed adjacent the path of travel of the heated glass elements and adapted to receive the element in tangential relationship, said form having a peripheral groove for receiving the element therein, gripping means on said form for attaching the front end of the advancing heated element tangentially to the form and within the groove therein, support means comprising a pair of aligned support shafts rotatably mounting said form for rotation about its axis to thereby draw and bend the heated element around the form within the groove therein, said form being divided into two disc-shaped sections axially separable at said groove and each mounted on a respective one of said support shafts, said shafts and associated discs being axially movable apart to provide an unobstructed space therebetween for removal of the bent glass element from said form by movement thereof through the said space, and means comprising a gaseous pressure supply adapted to be connected to the interior of the glass element for maintaining the atmosphere within said element at a sufficient pressure during the bending of the element to prevent collapsing of the softened wall thereof.

4. Apparatus for bending into circular shape a tubular lamp envelope assembly having a laterally-offset open exhaust tube, said apparatus comprising an oven, carrier means adjacent the oven to support and linearly advance said envelope through said oven, said carrier means including a push tube offset laterally of said envelope and adapted to receive the said exhaust tube, supplementary heating means located adjacent the path of travel of the glass element from the oven for progressively heating the advancing envelope to the softening point thereof, a drum-shaped form disposed adjacent the path of travel of the softened envelope and adapted to receive the envelope in tangential relationship, said form having a peripheral groove for receiving the envelope therein, gripping means on said form for attaching the front end of the advancing softened envelope to the form and within the groove therein, means rotatably mounting said form for rotation about its axis to thereby draw and bend the softened envelope around the form within the groove therein, and means comprising a gaseous pressure source adapted to be connected to the push tube for creating a flow of gas through said push tube to cause introduction of the gas into the envelope through the open exhaust tube thereof to thereby prevent collapsing of the softened envelope wall.

5. In apparatus of the class described for bending glass tubes into arcuate shape, a peripherally grooved forming drum comprising two sections axially separable through the groove and mounted on separate support members arranged to be moved apart for removal of the bent tube from the drum.

6. In apparatus of the class described for bending glass tubes into arcuate shape, a peripherally grooved forming drum comprising two sections axially separable through the groove and mounted on separate support members arranged to be moved apart for removal of the bent tube from the drum, and spring means normally holding said sections together.

ALFRED GREINER.

REFERENCES CITED

The following references are of record in the file of this patent:

UNITED STATES PATENTS

| Number | Name | Date |
| --- | --- | --- |
| 735,307 | Smith | Aug. 4, 1903 |
| 1,662,428 | Lowe | Mar. 13, 1928 |
| 2,080,899 | Pirani et al. | May 18, 1937 |
| 2,135,775 | Walker | Nov. 8, 1938 |
| 2,177,743 | Pfaff | Oct. 31, 1939 |
| 2,208,958 | Brown et al. | July 23, 1940 |